United States Patent
Wigard et al.

(10) Patent No.: US 11,616,568 B2
(45) Date of Patent: Mar. 28, 2023

(54) DYNAMIC CELL-SPECIFIC DELAY FOR TIMING SCALING IN A NON-TERRESTRIAL NETWORK (NTN)

(71) Applicant: Nokia Technologies Oy, Espoo (FI)

(72) Inventors: Jeroen Wigard, Klarup (DK); Mads Lauridsen, Gistrup (DK); Rafhael Amorim, Aalborg (DK); Frank Frederiksen, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 50 days.

(21) Appl. No.: 17/168,901

(22) Filed: Feb. 5, 2021

(65) Prior Publication Data

US 2021/0273717 A1     Sep. 2, 2021

Related U.S. Application Data

(60) Provisional application No. 62/983,148, filed on Feb. 28, 2020.

(51) Int. Cl.
*H04B 7/185*     (2006.01)
*H04W 76/27*    (2018.01)
(Continued)

(52) U.S. Cl.
CPC ....... *H04B 7/1855* (2013.01); *H04B 7/18539* (2013.01); *H04W 56/005* (2013.01); *H04W 76/27* (2018.02); *H04W 84/06* (2013.01)

(58) Field of Classification Search
None
See application file for complete search history.

(56) References Cited

U.S. PATENT DOCUMENTS 6,539,200 B1 *  3/2003  Schiff ................ H04B 7/18567
                                                             455/433
10,554,293 B1 *  2/2020  Chin .................. H04L 43/0864
(Continued)

FOREIGN PATENT DOCUMENTS

CN       110602779 A      12/2019
WO    2020/200393 A1    10/2020

OTHER PUBLICATIONS

Extended European Search Report received for corresponding European Patent Application No. 21158622.7, dated Aug. 3, 2021, 12 pages.
(Continued)

*Primary Examiner* — Lonnie V Sweet
(74) *Attorney, Agent, or Firm* — Squire Patton Boggs (US) LLP

(57) ABSTRACT

Systems, methods, apparatuses, and computer program products for dynamic cell-specific delay for timing scaling in a non-terrestrial network (NTN). For example, certain embodiments may utilize a cell-common delay composed of FL and part of SL (until a cell-specific reference surface). A network node (e.g., a gNB) may calculate the cell-common delay as a function of time (T_c(t)) and may provide this function to the UEs (the satellite path may beis deterministic). The function of time may be a combination of two functions representing the FL and SL. The function can may be broadcasted in a system information block (SIB) or transmitted directly to the UE through radio resource control (RRC) signaling when it becomes active, is handed over, and/or regularly updated.

20 Claims, 10 Drawing Sheets

600 — Receive information that identifies: at least one service link common delay as a function of time based on at least one orbit of at least one satellite and at least one reference surface, or at least one feeder link delay as a function of time based on the at least one orbit and at least one one position of at least one network node 602 — Update one or more timers or at least one uplink timing based on the at least one service link common delay or the at least one feeder link delay

(51) Int. Cl.
*H04W 56/00* (2009.01)
*H04W 84/06* (2009.01)

(56) References Cited

U.S. PATENT DOCUMENTS

| | | | | |
|---|---|---|---|---|
| 2015/0078250 | A1* | 3/2015 | Mineta | H04J 13/12 |
| | | | | 370/320 |
| 2015/0271730 | A1* | 9/2015 | Benammar | H04B 7/195 |
| | | | | 455/436 |
| 2017/0238216 | A1* | 8/2017 | Damnjanovic | H04W 16/28 |
| | | | | 455/427 |
| 2018/0083694 | A1* | 3/2018 | Rajagopalan | H04B 7/18519 |
| 2018/0368022 | A1 | 12/2018 | Benammar et al. | |
| 2019/0260463 | A1 | 8/2019 | Gopal et al. | |
| 2020/0383078 | A1* | 12/2020 | Hoshino | H04B 7/18515 |
| 2021/0058147 | A1* | 2/2021 | Zhang | H04W 74/00 |
| 2021/0075501 | A1* | 3/2021 | Xu | H04B 7/18523 |
| 2021/0099933 | A1* | 4/2021 | Matsuda | H04W 36/0055 |
| 2021/0274414 | A1* | 9/2021 | Määttänen | H04W 76/28 |
| 2021/0399797 | A1* | 12/2021 | Khan | H04B 7/18541 |
| 2022/0086713 | A1* | 3/2022 | Määttänen | H04W 36/00837 |
| 2022/0120840 | A1* | 4/2022 | Liberg | H04B 7/1851 |

OTHER PUBLICATIONS

"[108#06][NTN] Earth fixed vs. Earth moving cells in NTN LEO (Thales)", 3GPP TSG-RAN WG2 Meeting #108, R2-1916351, Agenda : 6.6.4.1, Thales, Nov. 18-22, 2019, pp. 1-38.
"On Timing Advance in NTN", 3GPP TSG RAN WG1 Meeting #96bis, R1-1905180, Agenda : 7.2.5.3, Thales, Apr. 7-13, 2019, 15 pages.
"Doppler Compensation, Uplink Timing Advance and Random Access in NTN", 3GPP TSG RAN WG1 #99, R1-1913017, Agenda : 7.2.5.3, Nokia, Nov. 18-22, 2019, pp. 1-28.
"Timing advance and PRACH design for NTN", 3GPP TSG RAN WG1 #99, R1-1912903, Agenda : 7.2.5.3, Panasonic, Nov. 18-22, 2019, pp. 1-13.
"Solutions for NR to Support Non-terrestrial Networks (NTN)", 3GPP TSG RAN meeting #86, RP-193234, Agenda : 9.1.2, Thales, Dec. 9-13, 2019, 10 pages.
"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.
"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.
U.S. Appl. No. 62/888,305, "Sync Location for NTN Access", filed Aug. 16, 2019, pp. 1-43.
"3rd Generation Partnership Project; Technical Specification Group Radio Access Network; NR; Physical layer procedures for control (Release 16)", 3GPP TS 38.213, V16.0.0, Dec. 2019, pp. 1-146.
"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.
"3rd Generation Partnership Project; Technical Specification Group Radio Access Network; NR; Radio Link Control (RLC) protocol specification (Release 15)", 3GPP TS 38.322, V15.5.0, Mar. 2019, pp. 1-33.
"Consideration on Random Access for NTN", 3GPP TSG-RAN WG2 #105 Meeting, R2-1900576, Agenda : 11.6.3.1, ZTE Corporation, Feb. 25-Mar. 1, 2019, pp. 1-8.
"Discussion on Timer Impacts in NTN", 3GPP TSG-RAN WG2 Meeting #104 , R2-1818246, Agenda : 11.6.3.1, Huawei, Nov. 12-16, 2018, 3 pages.
"Summary of 7.2.5.3 on UL Timing and PRACH", 3GPP TSG RAN WG1 #96bis, R1-1905732, Agenda : 7.2.5.3, ZTE, Apr. 8-12, 2019, pp. 1-8.
"Considerations on Random Access in NTN", 3GPP TSG RAN WG1 Meeting #92, R1-1801830, Agenda : 7.3.2, ZTE, Feb. 26-Mar. 2, 2018, pp. 1-3.
Saarnisaari et al., "Random Access Process Analysis of 5G New Radio Based Satellite Links", IEEE 2nd 5G World Forum (5GWF), Sep. 30-Oct. 2, 2019, pp. 654-658.
"Considerations on MAC Timers and on RTD Compensation Offset in Non-Terrestrial Networks (NTN)", 3GPP TSG-RAN WG2 Meeting # 104, R2-1818511, Agenda : 11.6.3.1, Nomor Research GmbH, Nov. 12-16, 2018, pp. 1-5.

* cited by examiner

Example for MAC retxBSR-Timer

300 → $f_{MAC.retxBSR-Timer}$(common delay , current timer value)
*Common delay can also be the delta between past and current value*

302 → Current value + common delay

304 → Current value + round(common delay)
  → Round may be a floor/ceiling
  → Value may be rounded to symbol, slot, ms, s, etc.

306 → Standard-based rounding(current value + common delay)
  → The sum may be adjusted to fit values of the standard
  → sf10, sf20, sf40, sf80, sf160, sf320, sf640, sf1280, sf2560

308 → Network may define additional (cell-specific) limits
  • Minimum/maximum allowed value of $f_{MAC.retxBSR-Timer}$
  • Minimum/maximum common delay delta (i.e., a limitation on the per update change of the timer)

FIG. 3

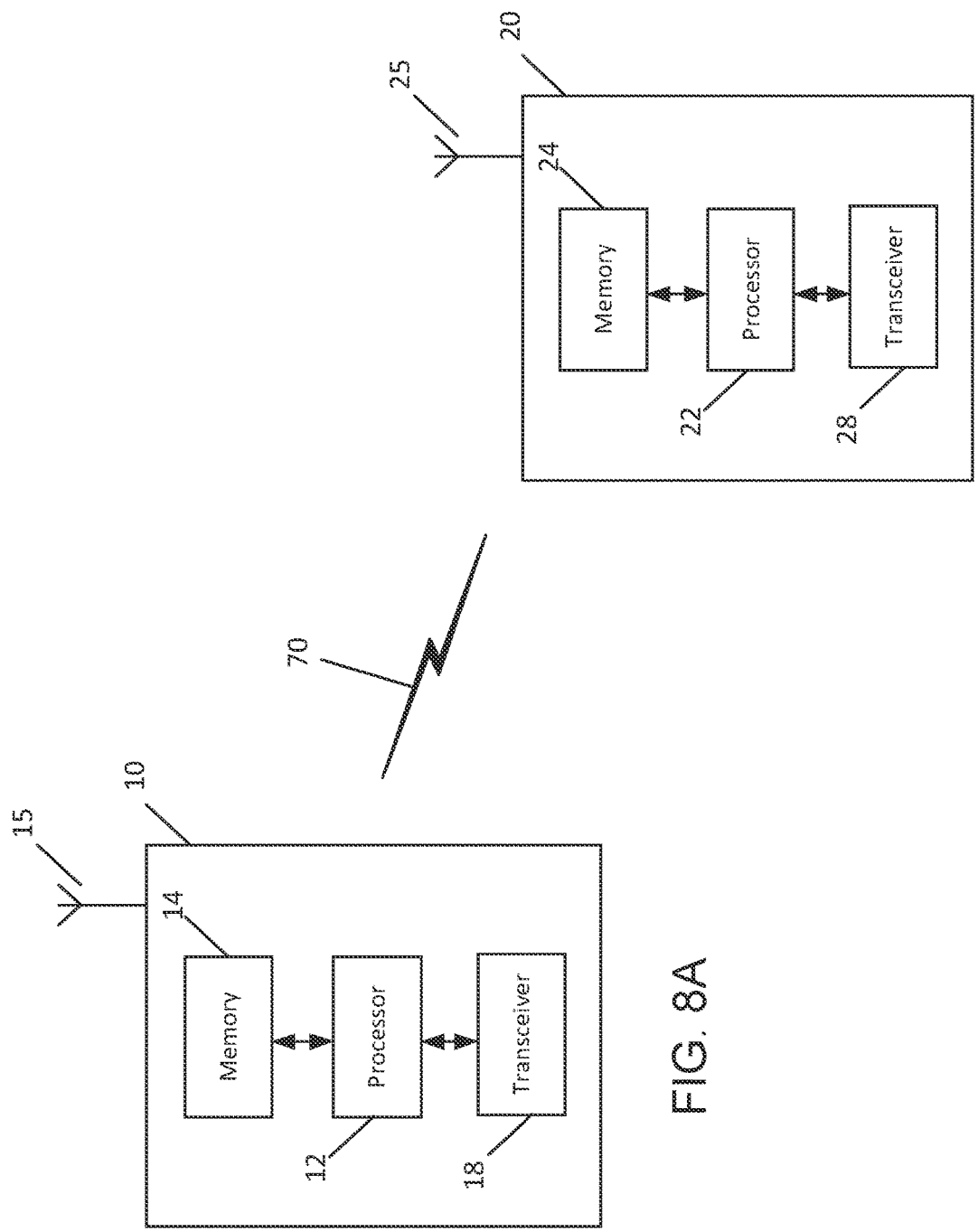

DYNAMIC CELL-SPECIFIC DELAY FOR TIMING SCALING IN A NON-TERRESTRIAL NETWORK (NTN)

CROSS REFERENCE TO RELATED APPLICATIONS

This application claims priority from U.S. Provisional Application No. 62/983,148, filed on Feb. 28, 2020. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for dynamic cell-specific delay for timing scaling in a non-terrestrial network (NTN).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein:

FIG. 3 illustrates an example a MAC retxBSR-Timer update, according to some embodiments

FIG. 8a illustrates an example block diagram of an apparatus, according to an embodiment; and FIG. 8b illustrates an example block diagram of an apparatus, according to another embodiment.

SUMMARY

Figure 1:
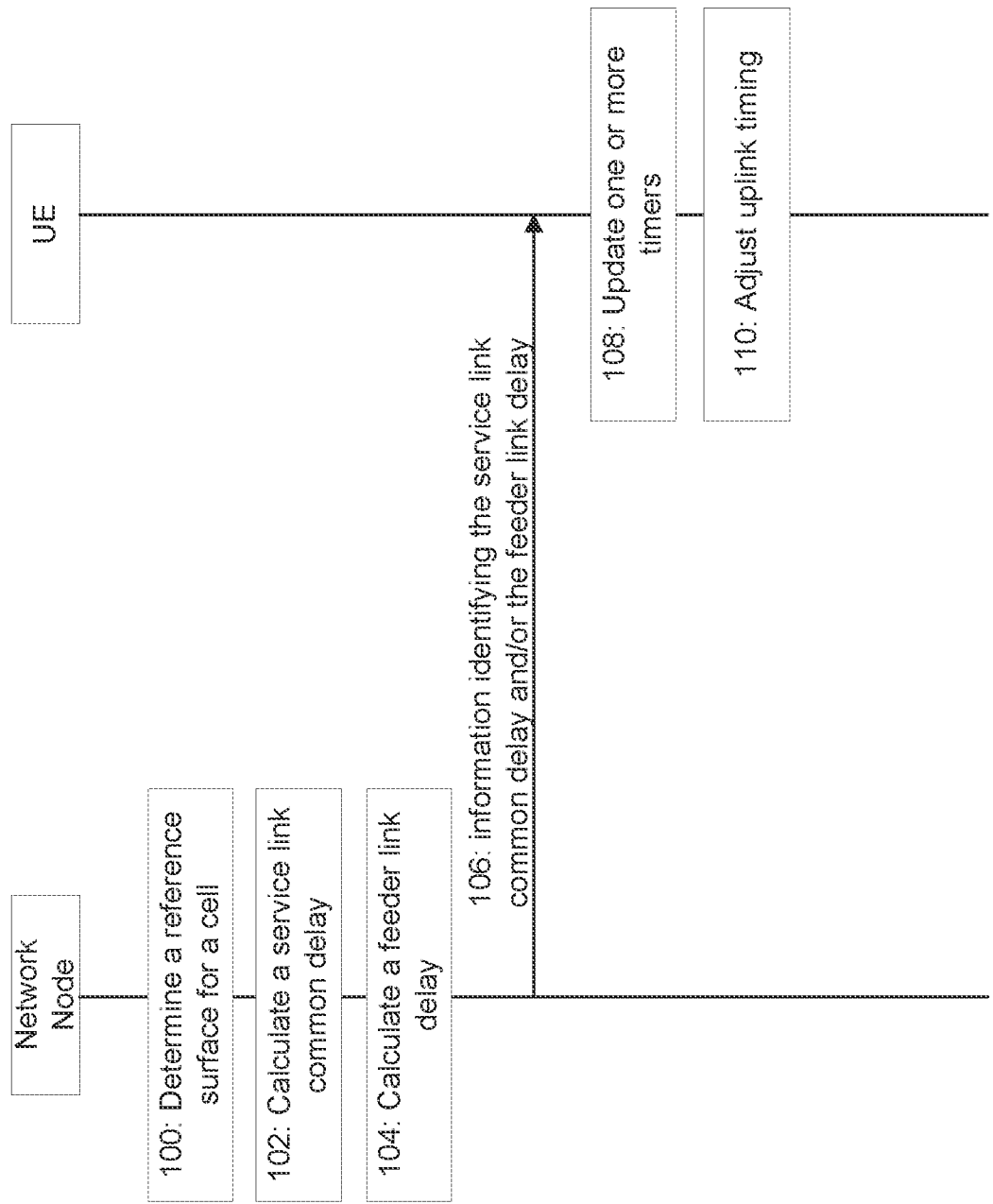
FIG. 1 illustrates an example signal diagram of dynamic cell-specific delay for timing scaling in a NTN, according to some embodiments.

According some aspects, there is provided the subject matter of the independent claims. Some further aspects are defined in the dependent claims. The embodiments that do not fall under the scope of the claims are to be interpreted as examples useful for understanding the disclosure.

In a first aspect thereof the exemplary embodiments of this invention provide a method that comprises receiving, by a user equipment, information that identifies at least one service link common delay as a function of time based on at least one orbit of at least one satellite and at least one reference surface, or at least one feeder link delay as a function of time based on the at least one orbit and at least one position of at least one network node; and updating one or more timers or at least one uplink timing based on the at least one service link common delay or the at least one feeder link delay.

In a further aspect thereof the exemplary embodiments of this invention provide an apparatus that comprises at least one memory comprising computer program code; at least one processor; wherein the at least one memory and the computer program code are configured, with the at least one processor, to cause the apparatus at least to calculate, based on at least one orbit of at least one satellite and at least one reference surface, at least one service link common delay as a function of time; calculate, based on the at least one orbit and at least one position of the apparatus, at least one feeder link delay as a function of time; and transmit, to at least one user equipment, information that identifies the at least one service link common delay and/or the at least one feeder link delay, wherein the at least one service link common delay or the at least one feeder link delay are associated with updating one or more timers or at least one uplink timing.

In another aspect thereof the exemplary embodiments of this invention provide an apparatus that comprises at least one memory comprising computer program code; at least one processor; wherein the at least one memory and the computer program code are configured, with the at least one processor, to cause the apparatus at least to receive information that identifies: at least one service link common delay as a function of time based on at least one orbit of at least one satellite and at least one reference surface, or at least one feeder link delay as a function of time based on the at least one orbit and at least one position of at least one network node; and update one or more timers or at least one uplink timing based on the at least one service link common delay or the at least one feeder link delay.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for dynamic cell-specific delay for timing scaling in a NTN is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Updates to NTN are, among other scenarios, targeting low Earth orbit (LEO) satellites at altitudes of 500-1500 kilometers (km). Each LEO satellite may provide NR service on Earth through one or more satellite beams and NR cells. Due to the low altitude, the satellites move at about 7.5 km per second (km/s) relative to Earth. In 3GPP, earth-fixed and earth-moving NR cells are considered. The former includes the satellite continuously adjusting the satellite beam pointing direction to fix the NR cell and NR beam to a specific point on earth, while the latter option includes fixing the satellite beam pointing direction, where the beam footprint (NR cell) is moving on Earth.

Certain NTN updates consider a transparent scenario, which means the gNB is on Earth, while the signal travels through a satellite to the user equipment (UE). As the satellite moves, both the length (i.e., propagation distance) of the feeder link (FL) and service link (SL) change rapidly. The total delay between a gNB and a UE can be split into feeder link delay, cell-specific common delay, and user-specific delay. The feeder link delay is the delay between the gNB and satellite. The feeder link delay is the same for all the UEs in a certain cell. It will vary over time due to movement of the satellite, but the delay is fully deterministic because the satellite movement is deterministic (planned constellations and orbits).

The cell-specific common delay, Tc, corresponds to the feeder link delay plus the part of the service link that is defined from the satellite and to a cell reference surface (a reference delay may translate to a set of reference points that can be regarded as a reference surface. In this way, a determined reference delay may translate to a reference surface, and vice versa). The reference surface is the same for all UEs in the cell and, therefore, this delay is identical for all users. The reference delay can be chosen such that it is smaller than, or at most, equal to, the delay experienced by any user in that cell (certain embodiments described herein apply equally to the opposite scenario, where the reference delay can be chosen such that it is greater than, or at least equal to, the delay experienced by a user in that cell (e.g., where the reference surface corresponds to a delay experienced by the user in the center of the cell). The use of a cell-specific common delay has been discussed in 3GPP to limit the needed range of timing advance.

The user-specific delay is the service link delay minus the cell-specific common delay. Referred to herein as Td, this delay can be relatively small through selection of the reference delay. Since the Td is the only UE-specific delay, the sum of the feeder link delay and the cell-specific common delay can be perceived by the UE as network processing delay.

The feeder link delay and cell-specific common delay can be rather large due to the satellite orbit altitude and distance to the Earth gateway/gNB. In addition, these delays can vary significantly. For example, delays can vary significantly between different scenarios. In a first example scenario (referred to as a LEO 600 SL scenario), the common part of the service link for an Earth-fixed cell may have the cell reference surface at the point above the middle of the fixed cell at a certain altitude (e.g., where the reference delay is chosen such that it is greater than, or at least equal to, the delay experienced by a user in that cell). In a second example scenario (referred to as a LEO 600 FL scenario with FL delay), the assumption is that the ground station is at the nadir of the satellite (e.g., the nadir of the satellite may refer to a point on a celestial body directly below the satellite) and the moving LEO satellite is at 600 km altitude. In a third example scenario (referred to as a LEO 600 total scenario), a sum of the above may represent the common cell delay for all UEs in the cell. In a fourth example scenario (referred to as a LEO 600 FL scenario with FL delay), the ground station is 1200 km away from the nadir but right under the serving satellite orbit (where the LEO satellite is at 600 km height and is moving away from the ground station (start point is right above the ground station)). A fifth example scenario (referred to as a LEO 600 total scenario) includes a sum of the LEO 600 FL scenario and the LEO 600 SL scenario. A sixth scenario (referred to as a LEO 1500 total scenario) may be like the LEO 600 total scenario, but the satellite height is 1500 km instead of 600 km.

In the above scenarios, the maximum delay for a particular scenario can be more than two times the amount of time (e.g., in milliseconds) for the minimum delay for that scenario. The delay varies fast over time and can be very different from case to case, both depending on satellite altitude and ground station location. Furthermore, the cell-location relative to satellite orbit also has an impact. This is the total gNB to reference surface delay. Typically, the further delay to the UE will be small as the reference surface can be chosen close to Earth. In some examples described above, the cell reference surface was chosen to include the nadir of the satellite.

In a communication system like NR, there are many control loops on many layers, which are included in the 3GPP specifications. They define actions based on the time after a transmission of a certain message and exist on the different layers from physical layer (PHY) to radio link control (RLC)/radio resource control (RRC) layers. For example, a UE will retransmit a buffer status report (BSR)

or send a new scheduling request (SR) if the network has not replied with a grant for it after some time (medium access control (MAC) layer procedures). Similarly, the RLC layer has timers related to retransmission (transmitting side) and reassembly (receiving side). These control loop timers may have to be adjusted to reflect the longer and varying delays of NTN and can reflect the type of NTN network and cell (satellite altitude, constellation, fixed vs moving cells, etc.).

New extended timers can be defined for the NTN case, but this is quite inefficient because if a static value is used, it will have to reflect the maximum delay of the cell. Since the value has to include both the satellite to common reference delay and the feeder link delay, the maximum can be large compared to the minimum. Thus, for large periods of time, the gNb will be operating with timers that are too conservative, reducing system performance and user experience. Alternatively, if a variable value is used, this may have to be updated at a certain rate. However, this update may have to be made per-timer per-UE and, given the large amount of control loop timers and UEs, it can result in significant control signalling overhead.

In current NR, most of the control loop timers are adjusted through RRC signalling. For example, the sr-ProhibitTimer, which defines how often the UE can use the SR (there is no acknowledgement/negative acknowledgement (ACK/NACK) to the SR, but only the limitation that the UE cannot send another SR while the timer is running), is configured through the SchedulingRequestConfig information element (IE). Similarly, for BSR, there is a logicalChannelSR-DelayTimer and a retxBSR-Timer, which both result in the UE having to delay a retransmission of the BSR (similar procedure as the SR). As another example, the RLC (reassembly) receive and retransmit poll (transmit) timers are also configured through RRC signalling of IEs).

Based on an abstract syntax notation (ASN) list, it can be observed that the granularity of the timers is low, at least when the absolute value of the timer is large. As previously stated, in today's NR, it would have to use RRC messages to reconfigure the timers and it would have to be performed per UE, when the NTN delays change. If the maximum value is used, it will result in unnecessary delays whenever there is an error in the UE-gNB communication (assuming the actual UE-gNB delay is lower).

On the RRC layers, there are also multiple timers related to RRC configuration and state changes. For example, the T300 timer is started by the RRC Idle UE after sending the RRCSetupRequest message (to initiate a new RRC connection). If the UE does not get RRCSetup or RRCReject from the network before the timer expires, the UE will declare "failure to establish connection." The T301 timer is started by the RRC Connected UE after detecting, for example, radio link failure or RRC reconfiguration failure. Specifically, the timer starts when the UE sends RRCReestablishmentRequest. If the UE does not get a RRCSetup or RRCReestablishment indication from the network before the timer expires, the UE will go to RRC Idle. The T319 timer is started by an RRC Inactive UE when it wants to re-establish the RRC Connection. The timer starts when the UE sends an RRCResumeRequest. If the UE does not receive a RRCResume, RRCSetup, RRCRelease, or RRCReject indication from the network before the timer expires, the UE will enter a RRC Idle mode.

Some prior solutions to the above described problems have included sync location for NTN access and dictionary-based compensation of timing advance. These solutions, however, focus on adjusting the timing advance (TA) only and not on the impact of the delay on all the timers. In addition, they focus on the total delay (for regenerative satellites), including the differential delay, and not on a cell-based concept, which may lower the control signalling used and conserve processing and/or computing resources, bandwidth or other network resources, and/or the like.

Some embodiments described herein may provide for dynamic cell-specific delay for timing scaling in a NTN, and may provide a solution to the problem of configuring control loop timers per-UE by targeting the varying delay in control loops in the case of a NTN. For example, certain embodiments may utilize a cell-common delay composed of FL and part of SL (until a cell-specific reference delay). A network node (e.g., a gNB) may calculate the cell-common delay as a function of time ($T_c(t)$) and may provide this function to the UEs (the satellite path may be deterministic). The function of time may be a combination of two functions representing the FL and SL. The function may be broadcasted in a system information block (SIB) (since the delays may also affect the random access procedure and RRC timers, the information may be made available to RRC Idle/Inactive UEs via SIB) or transmitted directly to the UE through RRC signaling when it becomes active, is handed over, and/or regularly updated.

The common part of the SL may be based on a cell reference surface close to the Earth, such that the UE specific part is small and not necessary to account for. Alternatively, an additional small offset may be added to also account for this time, which may make the delay function more conservative. In the case of a large cell, multiple reference surfaces may be created and a UE may then follow the delay function associated with the reference surface closest to it.

Timing relationships, related to when feedback may be used for certain functions (e.g., the MAC BSR and RLC layer retransmission, RRC response messages, etc.), may be a function of the cell-common delay. As an example the value retxBSR_Timer may be updated as follows using $T_c(t)$ (defined below) (e.g., retxBSR_Timer_new=$T_c(t)$+retxBSR_Timer). In this way, certain embodiments may address the updating of timing relationships without explicit signaling per UE (the exact value of Tc(t) may be rounded by the UE according to some implementations (e.g. to symbol, slot, absolute time value)). Reducing or eliminating signaling in this respect may conserve processing resources, computing resources, network resources (e.g., bandwidth), and/or the like that would otherwise be consumed through the use of other techniques for updating timing.

FIG. 1 illustrates an example signal diagram of dynamic cell-specific delay for timing scaling in a NTN, according to some embodiments. FIG. 1 illustrates a network node (e.g., a gNB) and a UE in communication. Certain embodiments are described using the timers and timing relationships involved in the random access (RA) procedure. Certain embodiments described herein apply equally to one or more of the timers described above, and to other relevant timers (e.g., timers illustrated in FIG. 2). RA may be used as an example to describe certain embodiments because it occurs at the beginning of the RRC connected mode phase, preceding any UE-specific communication or RRC settings negotiated between the UE and the network node. Because of this, certain embodiments may enable the UE and the network node to initiate conformable behaviors without having to use UE-specific communications.

Before any action in RRC connected mode, the UE may perform a RA attempt towards the network node. After the RA procedure is finalized, the UE may be allowed to perform a data transmission. However, there may be timers and timing relationships across several protocol layers whose current definitions may not enable a successful RA in NTN domain. For example, with respect to a MAC layer timer, after the UE transmits the RA preamble, the UE may initiate the ra-responseWindow. This timer may indicate to the UE the duration of the time window where a RA response (RAR) is expected. If no RAR is received, then the RA may be considered failed and a new attempt may be performed. However, the maximum value may be up to, for example, 80 slots, which may be smaller than the cell-specific physical delay. The UE may determine to postpone the start of the window, or to prolong the window, for a time at least equal to the cell-specific delay. In this case, the may UE have to have access to the window (i.e., have information about the window) before the RA is initiated.

With respect to a PHY timer, if the ra-responseWindow is prolonged, and the UE can successfully decode a RAR, there may be, in the RAR, 4 bits (or another quantity of bits) representing the time allocation of the message 3 on the random access procedure. In other words, these 4 bits may indicate the slot $S_r=n+k_2+\Delta$, that the UE may use to transmit message 3 for a RAR received in slot n. However, the values for $k_2+\Delta$ may not be large enough, and this slot may be past when the UE receives the grant. Therefore, an offset may have to be added: $k_2+\Delta+k_{offset}$. The $k_{offset}$ may be a function of the cell-specific delay, but the UE may have to have access to it before the RA is initiated.

In addition, with respect to PHY level timers, a similar time allocation may be designed for every other UL grant the network may send to the UE. These timers may also have to receive an offset in order to avoid allocations in past slots. This offset may be dynamic as the delay between UE and network node may vary over time.

With respect to MAC level timers again, after the UE sends the message 3, the UE may start the ra-contentionResolutionTimer, where it may expect, from the network node, more information about the contention resolution. This timer may have to have the same modifications as the ra-responseWindow. With respect to RRC layer timers, after the RA procedure is completed, the UE may try to attempt a RRC setup request. However, the T300 timer may be started by the RRC Idle UE after sending the RRCSetupRequest message (to initiate a new RRC connection). If the UE does not receive RRCSetup or RRCReject from the network node before the timer expires, the UE may provide a "failure to establish connection" indication Therefore, this timer may also have to be prolonged dynamically to ensure successful connection setup. Certain embodiments described herein may solve one or more of the issues listed above by creating a dynamic offset that may be determined and controlled by the network node, may be communicated to the UE (through signalling), and may be time-variant, in accordance with satellite movement.

As illustrated at 100, the network node may determine a reference delay for a cell. For example, the network node may determine a reference delay for its cell coverage area. The reference delay may be fixed to the satellite in the case of an Earth moving cell and may be fixed to the Earth in the case of an Earth fixed cell. The reference delay may not be known by the UE (e.g., the UE may not have or receive information that identifies the reference delay or that would allow the UE to determine the reference delay). The reference delay may be determined such that the UE-network node physical layer (PHY) delay may be measured as: a network node-reference delay plus a residual delay between the reference surface and the UE.

In some embodiments, determination of the reference delay may result in at least a portion of the network node-UE delay being accounted for as common delay. In some embodiments, multiple reference surfaces may be used per cell if the cell has a size that satisfies a threshold (e.g., if the cell is large, as determined with reference to a threshold). In some embodiments, UEs may be grouped according to the closest reference surface, as they may have to use the related common delay function. For example, between a choice of two different reference surfaces, a UE may be associated with the geographically closest reference surface to the UE.

As illustrated at 102, the network node may calculate a service link common delay. The network node may calculate the service link common delay based on an orbit of a satellite and a reference surface as a function of time. For example, by knowing the satellite orbit and the reference surface position, the network node may calculate the service link common delay as a function of time, Fsl_c(t).

As illustrated at 104, the network node may calculate a feeder link delay. The network node may calculate the feeder link delay based on the orbit of the satellite and a position of the network node as a function of time. For example, the network node, knowing the ground-gateway position and the satellite orbit, may calculate the feeder link delay as a function of time, Ffl(t).

As illustrated at 106, the network node may transmit, and the UE may receive, information that identifies the service link common delay and/or the feeder link delay (and/or that identifies a delay difference associated with the service link common delay or the feeder link delay). In some embodiments, when transmitting the information, the network node may transmit the information as parameters for a pre-specified parametrized function or indexes for pre-specified functions, or the calculated functions may be combined into a single function.

In some embodiments, the network node may broadcast the information to one or more UEs together with other NTN-specific information. If the network node utilizes broadcast transmission to transmit the information to the UE, the network node may transmit the information to the UE before the RA procedure is initiated. In some embodiments, when a handover of a UE from one cell to another cell is being performed, the common delay function of the new cell may be provided by the old cell (e.g., from the network node to another network node).

In some embodiments, the network node may transmit, and the UE may receive, information that identifies current function input and a refresh rate of the function to be used by the UE. For example, the network node may transmit information that identifies input information for calculating the service link common delay and/or the feeder link delay and a refresh rate associated with calculating the service link common delay and/or the feeder link dely. In some embodiments, with this information, the UE may be capable of calculating, for example, updated values for the common delay in future opportunities. Additionally, or alternatively, the network node may transmit, and the UE may receive, information that identifies the validity time of the function and the starting point in time for the function. For example, the network node may transmit information that identifies a validity time or a starting time for the service link common delay and/or the feeder link delay. In some embodiments, this information may include an absolute time or a system frame number (SFN). In some embodiments, the UE may use this information to determine how to apply the function at a particular moment in time.

As illustrated at 108, the UE may update one or more timers. For example, the UE may update the one or more timers based on the service link common delay and/or the feeder link delay. In some embodiments, based on the output of the common delay, one or more timers, which can benefit from extension, prorogation, delay in start, offset, etc., may be updated. In some embodiments, the UE and/or the network node may use information that identifies the one or more timers to determine which timers to update (e.g., the list of timers to be updated may be specified for conformity purposes).

In some embodiments, the UE may determine a manner in which common delay is to be transferred to impacted timers. For example, by knowing the total common delay, and by knowing the common delay is a significant part of the PHY delay, a formula can be specified for how the common delay is transferred to the impacted timers. As a specific example, the total delay transferred to the impacted timers may be equal to the common delay plus a constant value.

As illustrated at 110, the UE may adjust an uplink timing. For example, the UE may adjust the uplink timing based on the service link common delay and/or the feeder link delay (e.g., the UE may update uplink timing based on the feeder link and the service link functions). In some embodiments, in order to reduce the number of timing advance update commands used, there may be a rule that enables the UE to perform autonomous updates of its uplink timing advance based on the service link and feeder link functions. For example, the UE may use the knowledge of the total delay in consecutive instants in time to calculate the feeder and service link variations and to apply it to its own timing advance.

As described above, FIG. 1 is provided as an example. Other examples are possible, according to some embodiments.

Figure 2:
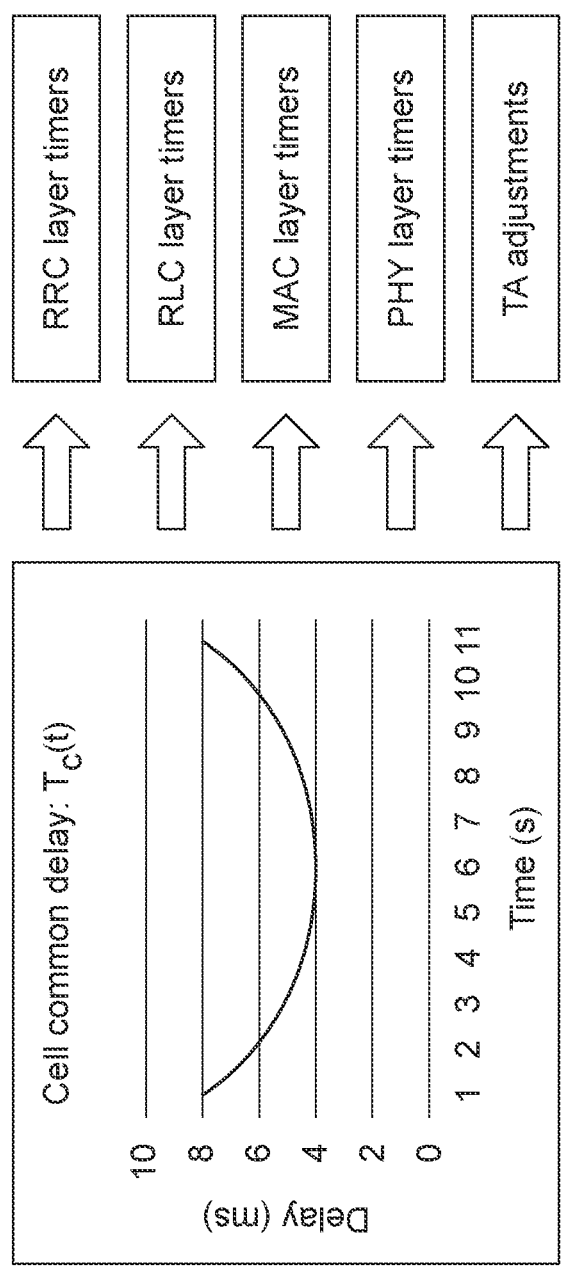
FIG. 2 illustrates an example of a cell common delay, according to some embodiments.

FIG. 2 illustrates an example of a cell common delay, according to some embodiments. For example, FIG. 2 illustrates how the cell common delay $T_c(t)$ may be given as a function to the UE and applied dynamically to timers on multiple layers, instead of continuous or multiple signaling updates of each timer on each layer. In some embodiments, a UE may update its timing based on the $T_c(t)$ function and/or when it receives TA commands from the network node.

As indicated above, FIG. 2 is provided as an example. Other examples are possible, according to some embodiments.

In some embodiments, each of the timers to be updated (e.g., PHY, MAC, RLC, RRC, etc.) may have to have different mapping from the common delay (the cell specific delay). FIG. 3 illustrates an example for a MAC retxBSR-Timer, according to some embodiments. As illustrated at 300, the function for this timer may be based on the common delay and the current timer value as inputs ($f_{MAC.retxBSR-Timer}$(common delay, current timer value)). The common delay may be a difference (delta) between past and current values for the common delay. As illustrated at 302, the current value and the common delay may be added together. In some embodiments, the current value and a rounded common delay may be added together, as illustrated at 304. In some embodiments, the round operation may produce a floor or a ceiling value (e.g., a maximum or a minimum value) for the common delay. In some embodiments, the value of the common delay may be rounded to a symbol, a slot, a millisecond (ms), a second (s), etc. As illustrated at 306, some embodiments may utilize a 3GPP standard-based rounding on a sum of the common delay and the current value. For example, the sum may be adjusted to fit values of the standard (e.g., 10 sub-frames (sf10), 20 sub-frames (sf20), etc.).

As illustrated at 308, the network (e.g., a network node) may define additional (cell-specific) limits. For example, these limits may be a minimum or maximum allowed value for the function $f_{MAC.retxBSR-Timer}$, a minimum or maximum common delay delta (which may be a limitation on the per change of the timer), and/or the like. As described elsewhere herein, the UE and the network node may have to agree on when the UE is to update one or more timers. In some embodiments, this may be controlled by the network node.

When a new timer (or counter) value is to be updated, the UE may follow a 3GPP NR specification. For example, timers related to Radio Link Failure may be updated as follows: The UE may, if the received rlf-TimersAndConstants is set to release, use values for timers T301, T310, T311 and constants N310, N311, as included in ue-TimersAndConstants received in system information block 1 (SIB1). Otherwise, the UE may (re-)configure the value of timers and constants in accordance with received rlf-TimersAndConstants, stop timer T310 for this cell group, if running, and reset the counters N310 and N311. Thus, if the T310 timer (started when N310 consecutive out-of-sync messages are received) is running, when a new configuration is available, the timer may be stopped and the related counter N310 may be reset.

Alternatively, MAC timers may not be updated until the timer is either started or restarted (e.g., according to a 3GPP standard). For example, when a reconfiguration of the MAC entity may be requested by upper layers, the MAC entity (UE) may initialize the corresponding hybrid automatic repeat request (HARQ) entity upon addition of a secondary cell (Scell), remove the corresponding HARQ entity upon removal of a SCell, apply the new value for timers when the timer is (re)started, apply the new maximum parameter value when counters are initialized, and apply immediately the configurations received from upper layers for other parameters.

In some embodiments, when the UE updates one or more timer values, the timers may not be reset if currently running Instead, a timer value may be updated as the timer is running without interruption to the iteration of the timer. In some embodiments, if the running timer is prolonged, the UE may determine to wait until the timer expires prior to performing an action. In some embodiments, if the running timer is shortened to a point where it expires, the UE may initiate the one or more actions to be performed upon expiry of the timer.

As indicated above, FIG. 3 is provided merely as an example. Other examples are possible.

Figure 4A:
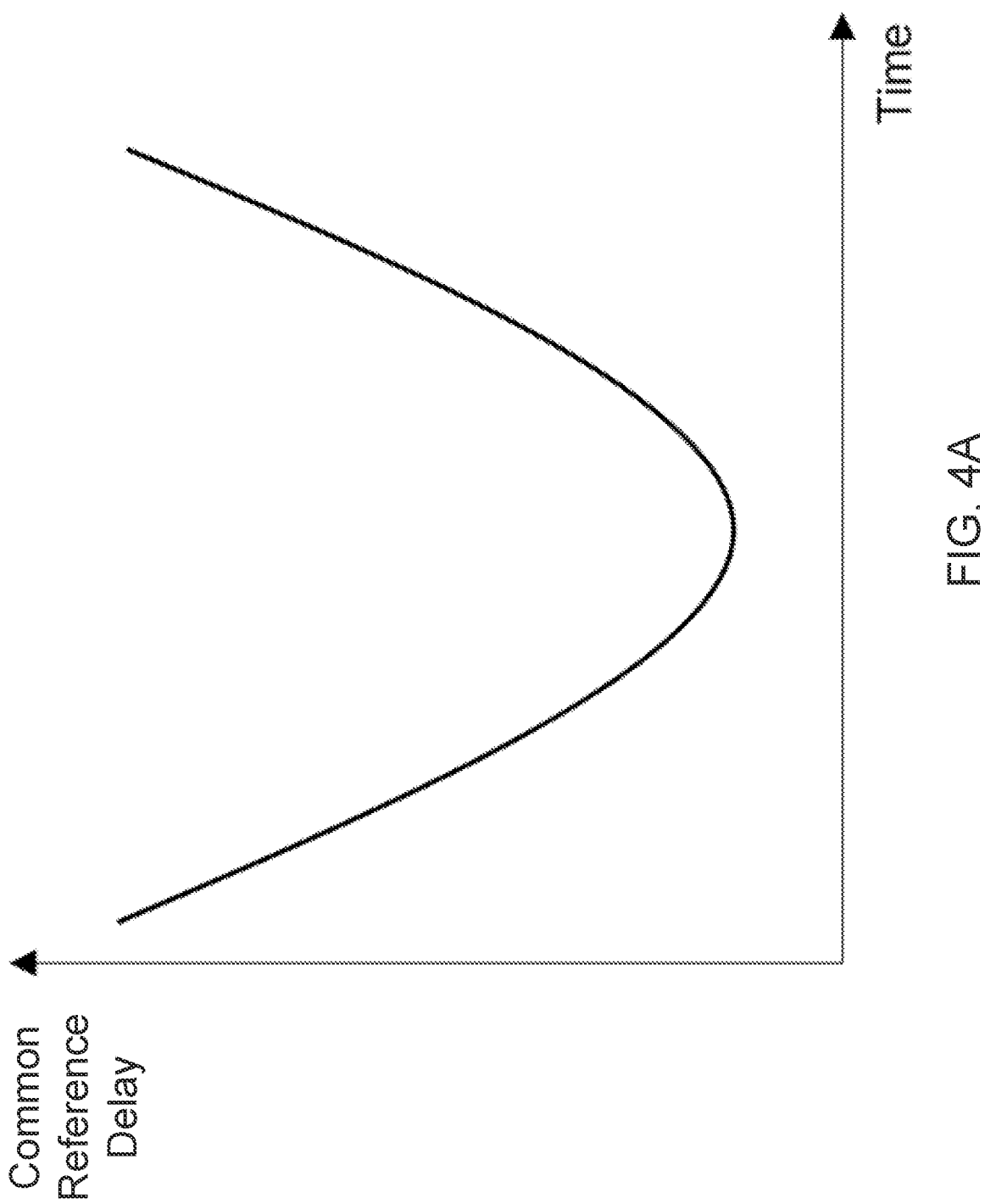
FIG. 4a illustrates an example of common reference delay, according to some embodiments.
Figure 4B:
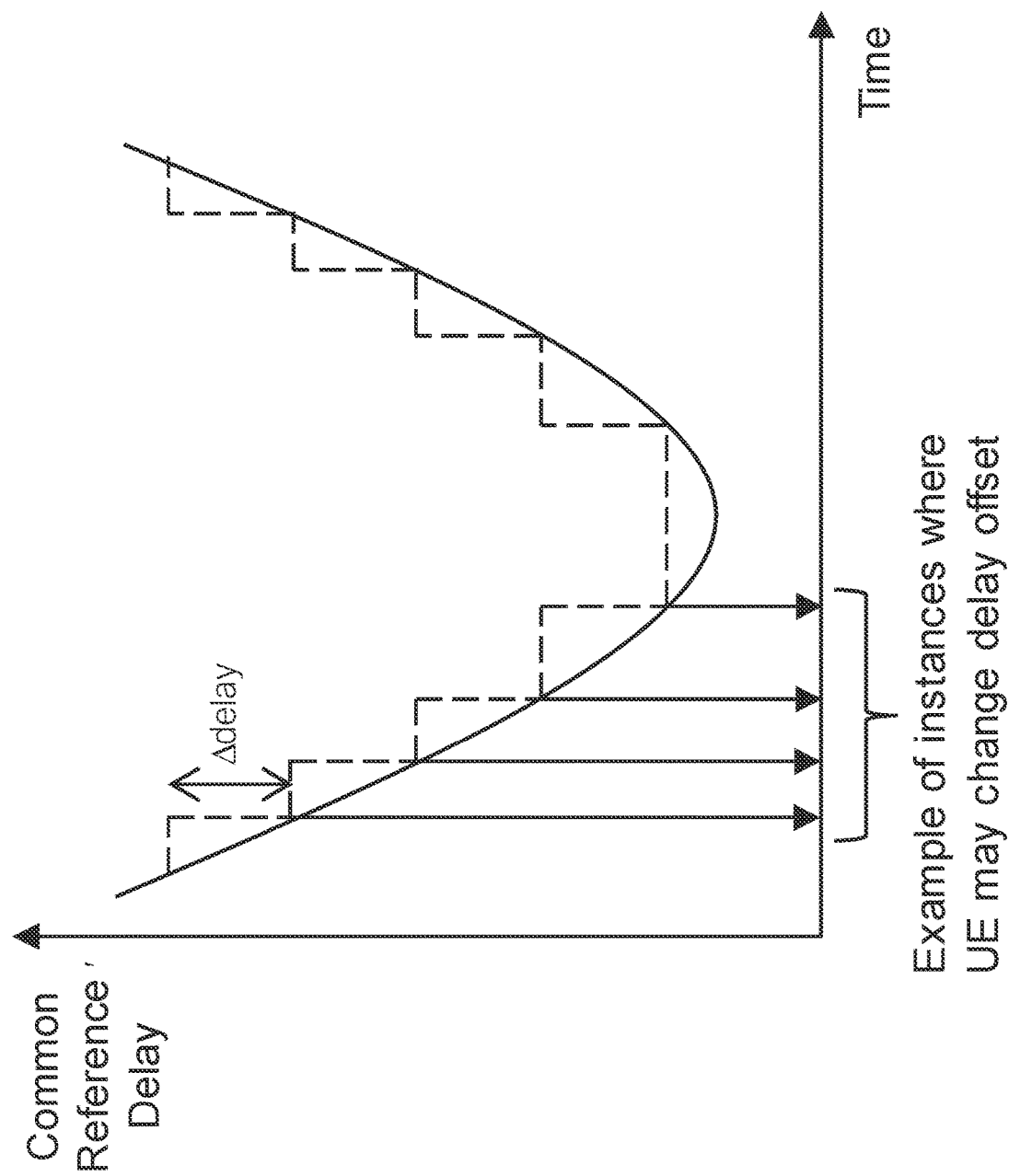
FIG. 4b illustrates an example of a delay difference with respect to a common reference delay, according to some embodiments.

FIG. 4*a* illustrates an example of common reference delay, according to some embodiments. In some embodiments, the network node may transfer, to UE, the function illustrated in FIG. 4*a*. This function may describe a common reference delay as a function of time. FIG. 4*b* illustrates an example of a delay difference with respect to a common reference delay, according to some embodiments. There may be a need for network control in terms of when the UE applies an update to a timer. The plot illustrated in FIG. 4*b* illustrates how a difference in delay (Δdelay) (e.g., common reference delay at time 2−common reference delay at time 1) may be signaled from the network node to the UE. When the common reference delay function has changed the Δdelay, the UE may update the timer. Since the network node may also know the function and the Δdelay, it may be aware of the change without a need for signaling from the UE to indicate that the change has occurred. This conserves processing resources, computing resources, and/or network resources (e.g., bandwidth) that would otherwise be consumed due to such signaling.

As described above, FIGS. 4a and 4b are provided as an example. Other examples are possible, according to some embodiments.

Figure 5A:
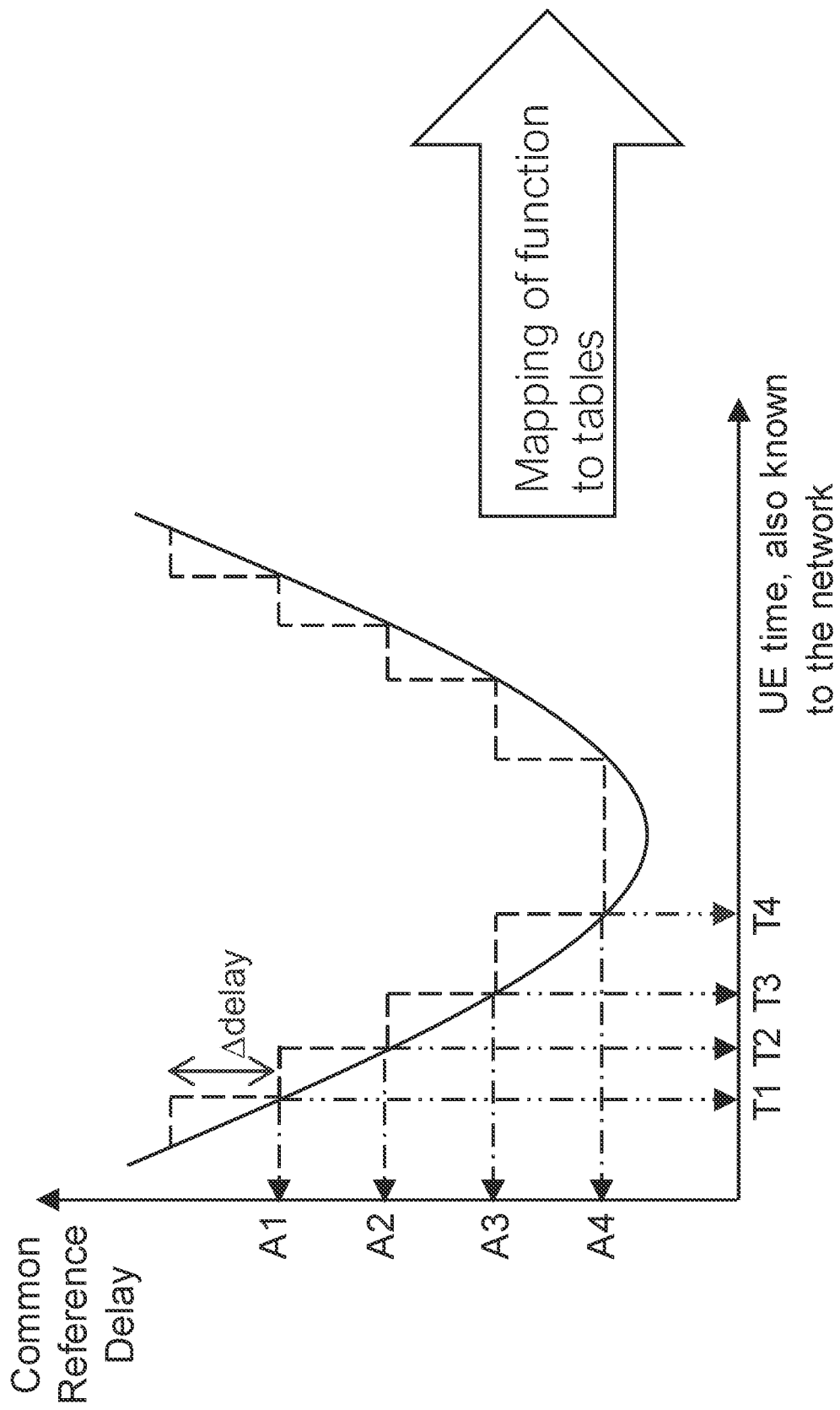
FIG. 5a illustrates an example of a mapping between a function and a set of tables, according to some embodiments.
Figure 5B:
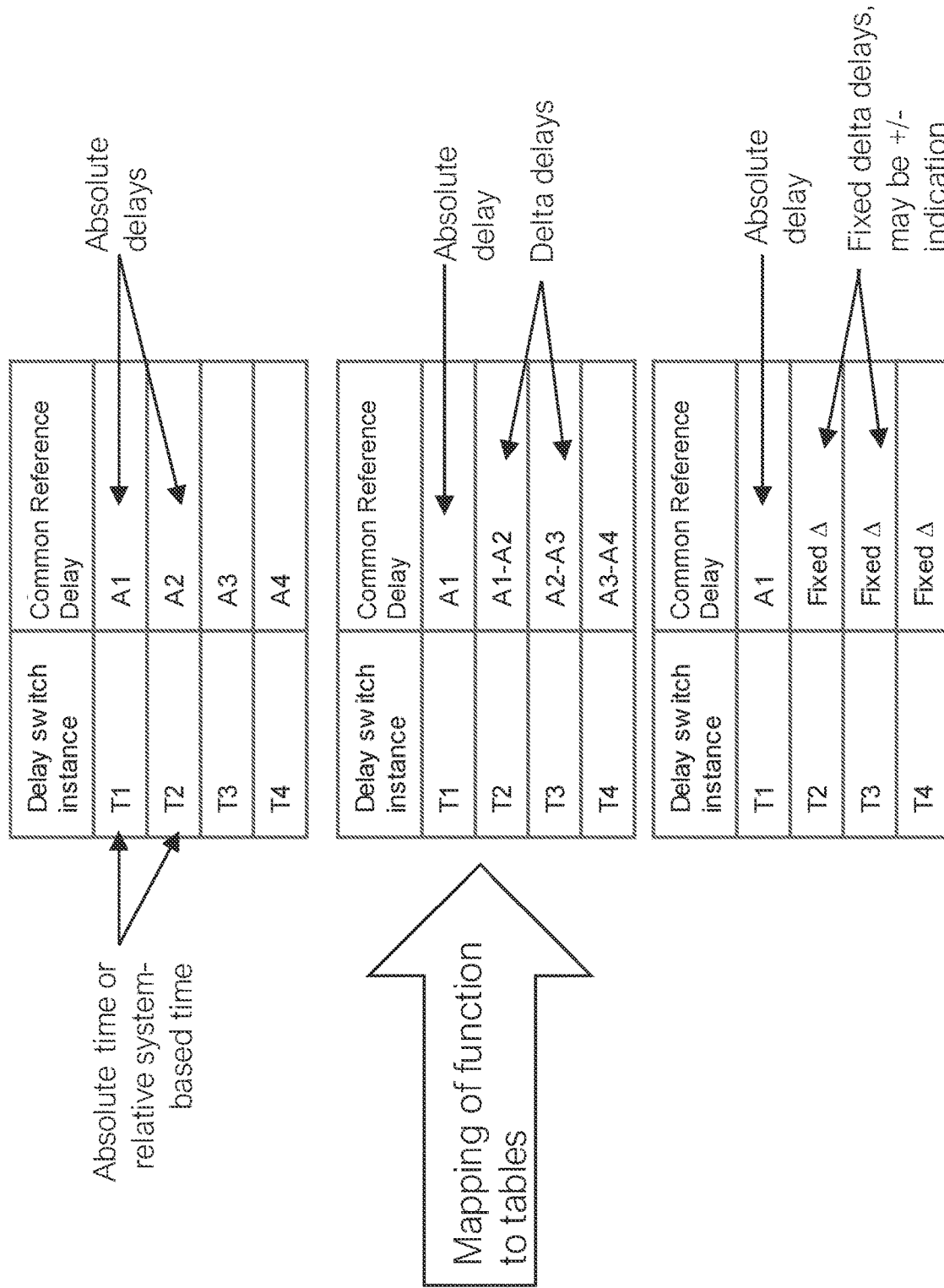
FIG. 5b illustrates an example of a mapping between a function and a set of tables, according to some embodiments

FIGS. 5a and 5b illustrate an example of a mapping between a function and a set of tables, according to some embodiments. For example, FIGS. 5a and 5b illustrate how the function and control may be implemented as a table. From these figures, it can be seen that the proposed tables may include the times T1, T2, T3, T4, where the UE may update the common reference delay (A1, A2, A3, A4) and thus related, relevant timers. In some embodiments, the table may identify the initial T1 and then a defined delta delay in the UE time domain (e.g., T2−T1=T3−T2=T4−T3) until the next update. Alternatively, an update every time period defined by a system frame number modulo x may be implemented (e.g., where X may be, for example, 10, and where x may be a network-controlled parameter). In some embodiments, the update may be based on the delta delay in the common reference delay (e.g., A2−A1=A3−A2=A4−A3, as illustrated), because this is what may impact the timers.

As described above, FIGS. 5a and 5b are provided as an example. Other examples are possible, according to some embodiments.

Figure 6:
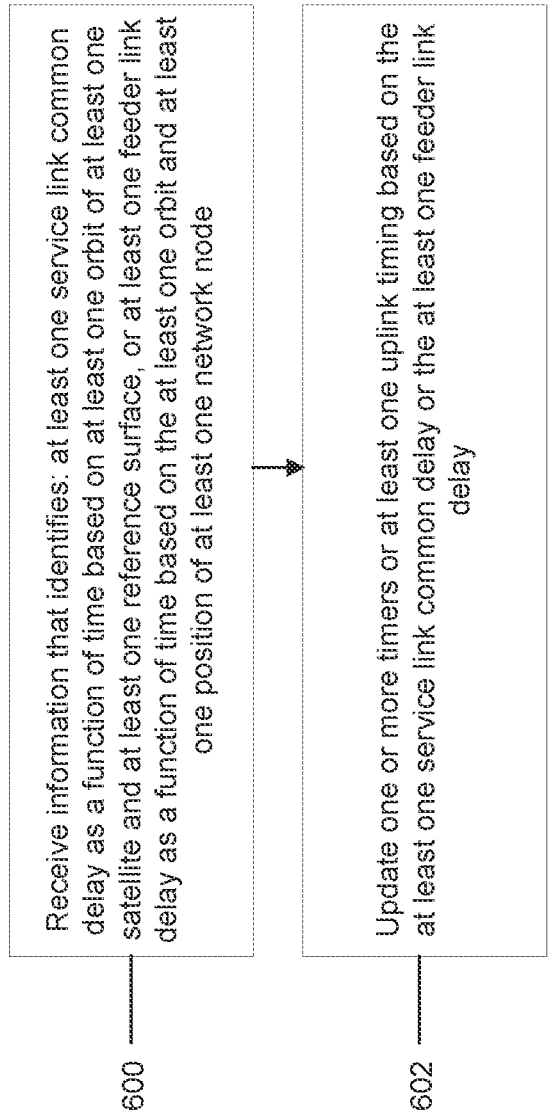
FIG. 6 illustrates an example flow diagram of a method, according to some embodiments.

FIG. 6 illustrates an example flow diagram of a method, according to some embodiments. For example, FIG. 6 shows example operations of a UE (e.g., apparatus 20). Some of the operations illustrated in FIG. 6 may be similar to some operations shown in, and described with respect to, FIGS. 1-5.

In an embodiment, the method may include, at 600, receiving information that identifies: at least one service link common delay as a function of time based on at least one orbit of at least one satellite and at least one reference surface, or at least one feeder link delay as a function of time based on the at least one orbit and at least one position of at least one network node. In an embodiment, the method may include, at 602, updating one or more timers or at least one uplink timing based on the at least one service link common delay or the at least one feeder link delay.

In some embodiments, the at least one reference surface may be fixed to the at least one satellite or may be fixed to the Earth. In some embodiments, the at least one reference surface may be unknown to the UE. In some embodiments, at least one network node-UE physical layer delay may be measured as at least one network node reference delay plus at least one residual delay between the at least one reference surface and the UE. In some embodiments, the at least one reference surface may comprise multiple reference surfaces if at least one cell associated with the at least one network node has a size that satisfies a threshold. In some embodiments, the UE may be associated with a closest reference surface of the multiple reference surfaces.

In some embodiments, the receiving may further comprise receiving the information via broadcast of the information. In some embodiments, the information may be included in at least one of: at least one parameter for at least one pre-specified parametrized function, at least one index for at least one pre-specified function, at least one combined function for both the at least one service link common delay or the at least one feeder link delay, at least one SIB, or RRC signaling. In some embodiments, the method may further comprise receiving information that identifies input information associated with calculating the at least one service link common delay or the at least one feeder link delay or information that identifies at least one refresh rate associated with calculating the at least one service link common delay or the at least one feeder link delay.

In some embodiments, the method may further comprise receiving at least one validity time or at least one starting point in time for the at least one service link common delay or the at least one feeder link delay. In some embodiments, the method may further comprise receiving information that identifies at least one delay difference associated with the at least one service link common delay or the at least one feeder link delay. In some embodiments, the method may further comprise transmitting at least one delay difference in a time domain associated with the UE.

In some embodiments, the method may further comprise transmitting at least one network-controlled parameter. In some embodiments, the at least one network-controlled parameter may be associated with causing at least one update of one or more timers at at least one time determined by a function: at least one system frame number modulo the at least one network-controlled parameter. In some embodiments, the updating may comprise updating the one or more timers without resetting the one or more timers based on the one or more timers running at a time that the one or more timers are updated. In some embodiments, the method may further comprise determining to wait for expiration of the one or more running timers, before performing one or more actions, based on the updating prolonging running of the one or more timers. In some embodiments, the method may further comprise performing one or more actions based on the updating shortening the running of the one or more timers past an expiration time of the one or more timers.

As described above, FIG. 6 is provided as an example. Other examples are possible according to some embodiments.

Figure 7:
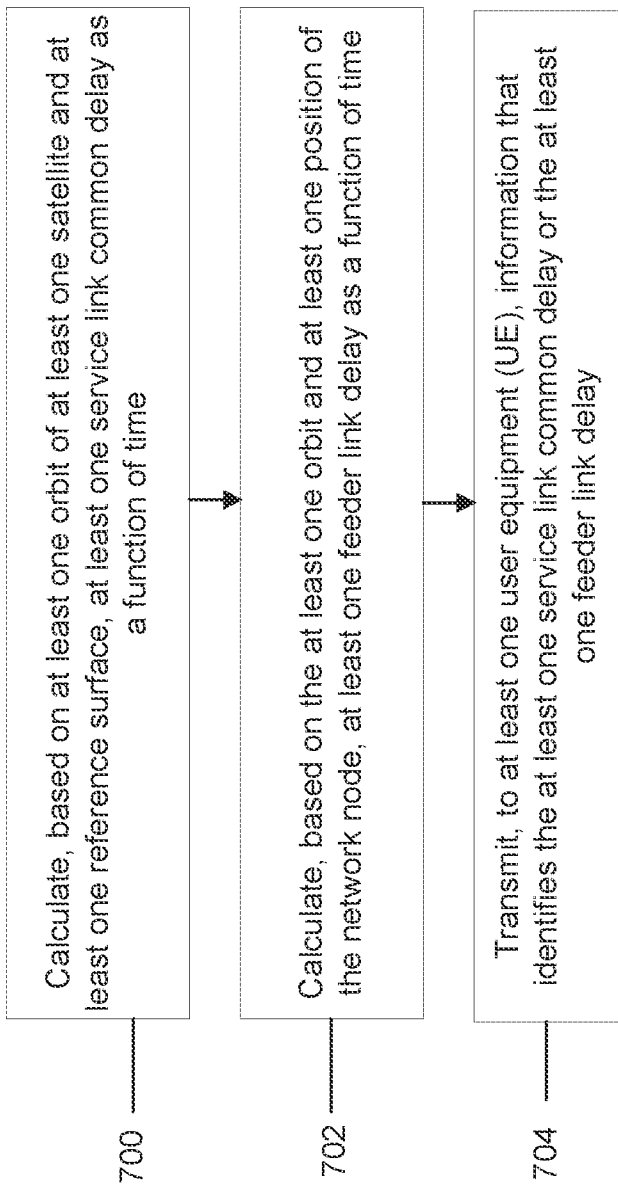
FIG. 7 illustrates an example flow diagram of a method, according to some embodiments.

FIG. 7 illustrates an example flow diagram of a method, according to some embodiments. For example, FIG. 7 shows example operations of a network node (e.g., apparatus 10). Some of the operations illustrated in FIG. 7 may be similar to some operations shown in, and described with respect to, FIGS. 1-5.

In an embodiment, the method may include, at 700, calculating, based on at least one orbit of at least one satellite and at least one reference surface, at least one service link common delay as a function of time. In an embodiment, the method may include, at 702, calculating, based on the at least one orbit and at least one position of the network node, at least one feeder link delay as a function of time. In an embodiment, the method may include, at 704, transmitting, to at least one user equipment (UE), information that identifies the at least one service link common delay or the at least one feeder link delay. The at least one service link common delay or the at least one feeder link delay may be associated with updating one or more timers or at least one uplink timing.

In some embodiments, the at least one reference surface may be fixed to the at least one satellite or may be fixed to the Earth. In some embodiments, the at least one reference surface may be unknown to the at least one user equipment (UE). In some embodiments, at least one network node-user equipment (UE) physical layer delay may be measured as at least one network node reference delay plus at least one residual delay between the at least one reference surface and the at least one user equipment (UE). In some embodiments, the at least one reference surface may comprise multiple reference surfaces if at least one cell associated with the network node has a size that satisfies a threshold. In some embodiments, the at least one user equipment (UE) may be grouped according to a closest reference surface of the multiple reference surfaces.

In some embodiments, the transmitting may further comprise transmitting the information to the at least one UE via broadcast of the information. In some embodiments, the method may further comprise transmitting the information that identifies the at least one service link common delay or the at least one feeder link delay to at least one other network node associated with at least one cell that is different than one or more cells associated with the network node. In some embodiments, the information may be included in at least one of: at least one parameter for at least one pre-specified parametrized function, at least one index for at least one pre-specified function, at least one combined function for both the service link common delay and the feeder link delay, at least one SIB, or RRC signaling. In some embodiments, the method may further comprise transmitting information that identifies input information associated with calculating the at least one service link common delay or the at least one feeder link delay and information that identifies at least one refresh rate associated with calculating the at least one service link common delay and the at least one feeder link delay.

In some embodiments, the method may further comprise transmitting at least one validity time or at least one starting point in time for the at least one service link common delay or the at least one feeder link delay. In some embodiments, the method may further comprise transmitting information that identifies at least one delay difference associated with the at least one service link common delay or the at least one feeder link delay. In some embodiments, the method may comprise transmitting at least one delay difference in a time domain associated with the at least one UE. In some embodiments, the method may comprise transmitting at least one network-controlled parameter. The at least one network-controlled parameter may be associated with an update of one or more timers at at least one time determined by a function: at least one system frame number modulo the at least one network-controlled parameter.

As described above, FIG. 7 is provided as an example. Other examples are possible according to some embodiments.

FIG. 8a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8a.

As illustrated in the example of FIG. 8a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-7.

For instance, in one embodiment, apparatus 10 may be controlled by memory 14 and processor 12 to calculate, based on at least one orbit of at least one satellite and at least one reference surface, at least one service link common delay as a function of time. In one embodiment, apparatus 10 may be controlled by memory 14 and processor 12 to calculate, based on the at least one orbit and at least one position of the network node, at least one feeder link delay as a function of time. In one embodiment, apparatus 10 may be controlled by memory 14 and processor 12 to transmit, to at least one user equipment (UE), information that identifies the at least one service link common delay or the at least one feeder link delay. The at least one service link common delay or the at least one feeder link delay may be associated with updating one or more timers or at least one uplink timing.

FIG. 8b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8b.

As illustrated in the example of FIG. 8b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-7.

For instance, in one embodiment, apparatus 20 may be controlled by memory 24 and processor 22 to receive information that identifies: at least one service link common delay as a function of time based on at least one orbit of at least one satellite and at least one reference surface, or at least one feeder link delay as a function of time based on the at least one orbit and at least one position of at least one network node. In one embodiment, apparatus 20 may be controlled by memory 24 and processor 22 to update one or more timers or at least one uplink timing based on the at least one service link common delay or the at least one feeder link delay.

Therefore, certain example embodiments provide several technological improvements, enhancements, and/or advantages over existing technological processes. For example, one benefit of some example embodiments is addressing the updating of timing relationships without explicit signaling per UE. Accordingly, the use of some example embodiments results in improved functioning of communications networks and their nodes and, therefore constitute an improvement at least to the technological field of updating a timer and/or an uplink timing, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include calculating, by a network node based on at least one orbit of at least one satellite and at least one reference surface, at least one service link common delay as a function of time. The method may include calculating, based on the at least one orbit and at least one position of the network node, at least one feeder link delay as a function of time. The method may include transmitting, to at least one user equipment (UE), information that identifies the at least one service link common delay or the at least one feeder link delay. The at least one service link common delay or the at least one feeder link delay may be associated with updating one or more timers or at least one uplink timing.

In a variant, the at least one reference surface may be fixed to the at least one satellite or is fixed to the Earth. In a variant, the at least one reference surface may be unknown to the at least one user equipment (UE). In a variant, at least one network node-user equipment (UE) physical layer delay may be measured as at least one network node reference delay plus at least one residual delay between the at least one reference surface and the at least one user equipment (UE). In a variant, the at least one reference surface may comprise multiple reference surfaces if at least one cell associated with the network node has a size that satisfies a threshold. In a variant, the at least one user equipment (UE) are grouped according to a closest reference surface of the multiple reference surfaces.

In a variant, the transmitting may further comprise transmitting the information to the at least one user equipment (UE) via broadcast of the information. In a variant, the method may include transmitting the information that identifies the at least one service link common delay or the at least one feeder link delay to at least one other network node associated with at least one cell that is different than one or more cells associated with the network node. In a variant, the information may be included in at least one of at least one parameter for at least one pre-specified parametrized function, at least one index for at least one pre-specified function, at least one combined function for both the service link common delay and the feeder link delay, at least one system information block (SIB), or radio resource control (RRC) signaling.

In a variant, the method may include transmitting information that identifies input information associated with calculating the at least one service link common delay or the at least one feeder link delay and information that identifies at least one refresh rate associated with calculating the at least one service link common delay and the at least one feeder link delay. In a variant, the method may include transmitting at least one validity time or at least one starting point in time for the at least one service link common delay or the at least one feeder link delay.

In a variant, the method may include transmitting information that identifies at least one delay difference associated with the at least one service link common delay or the at least one feeder link delay. In a variant, the method may include transmitting at least one delay difference in a time domain associated with the at least one user equipment (UE). In a variant, the method may include transmitting at least one network-controlled parameter. In a variant, the at least one network-controlled parameter may be associated with an update of the one or more timers at at least one time determined by a function: at least one system frame number modulo the at least one network-controlled parameter.

According to a second embodiment, a method may include receiving, by a user equipment (UE), information that identifies: at least one service link common delay as a function of time based on at least one orbit of at least one satellite and at least one reference surface, or at least one feeder link delay as a function of time based on the at least one orbit and at least one position of at least one network node. The method may include updating one or more timers or at least one uplink timing based on the at least one service link common delay or the at least one feeder link delay.

In a variant, the at least one reference surface may be fixed to the at least one satellite or is fixed to the Earth. In a variant, the at least one reference surface may be unknown to the user equipment (UE). In a variant, at least one network node-user equipment (UE) physical layer delay may be measured as at least one network node reference delay plus at least one residual delay between the at least one reference surface and the user equipment (UE).

In a variant, the at least one reference surface may comprise multiple reference surfaces if at least one cell associated with the at least one network node has a size that satisfies a threshold. In a variant, the user equipment (UE) may be associated with a closest reference surface of the multiple reference surfaces. In a variant, the receiving may further comprise receiving the information via broadcast of the information. In a variant, the information may be included in at least one of at least one parameter for at least one pre-specified parametrized function, at least one index for at least one pre-specified function, at least one combined function for both the at least one service link common delay or the at least one feeder link delay, at least one system information block (SIB), or radio resource control (RRC) signaling.

In a variant, the method may include receiving information that identifies input information associated with calculating the at least one service link common delay or the at least one feeder link delay or information that identifies at least one refresh rate associated with calculating the at least one service link common delay or the at least one feeder link delay. In a variant, the method may include receiving at least one validity time or at least one starting point in time for the at least one service link common delay or the at least one feeder link delay. In a variant, the method may include receiving information that identifies at least one delay difference associated with the at least one service link common delay or the at least one feeder link delay.

In a variant, the method may include transmitting at least one delay difference in a time domain associated with the user equipment (UE). In a variant, the method may include transmitting at least one network-controlled parameter. In a variant, he at least one network-controlled parameter is associated with causing at least one update of one or more timers at at least one time determined by a function: at least one system frame number modulo the at least one network-controlled parameter. In a variant, the updating may comprise updating the one or more timers without resetting the one or more timers based on the one or more timers running at a time that the one or more timers are updated.

In a variant, the method may include determining to wait for expiration of the one or more running timers, before performing one or more actions, based on the updating prolonging running of the one or more timers. In a variant, the method may include performing one or more actions based on the updating shortening the running of the one or more timers past an expiration time of the one or more timers.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to perform the method according to the first embodiment or the second embodiment, or any of the variants discussed above.

A fifth embodiment may be directed to an apparatus that may include means for performing the method according to the first embodiment or the second embodiment, or any of the variants discussed above.

A sixth embodiment may be directed to a computer readable medium comprising program instructions stored thereon for performing at least the method according to the first embodiment or the second embodiment, or any of the variants discussed above.

A seventh embodiment may be directed to a computer program product encoding instructions for performing at least the method according to the first embodiment or the second embodiment, or any of the variants discussed above.

PARTIAL GLOSSARY

FL Feeder Link
SL Service Link

What is claimed is:

1. A method, comprising:
receiving, by a user equipment, information that identifies:
at least one service link common delay as a function of time based on at least one orbit of at least one satellite and at least one reference surface, or
at least one feeder link delay as a function of time based on the at least one orbit and at least one position of at least one network node; and
updating one or more timers other than at least one uplink timing based on the at least one service link common delay or the at least one feeder link delay.

2. An apparatus, comprising:
at least one processor; and
at least one memory including computer program code,
wherein the at least one memory and the computer program code are configured to, with the at least one processor, cause the apparatus at least to:
calculate, based on at least one orbit of at least one satellite and at least one reference surface, at least one service link common delay as a function of time;
calculate, based on the at least one orbit and at least one position of the apparatus, at least one feeder link delay as a function of time; and
transmit, to at least one user equipment, information that identifies the at least one service link common delay and/or the at least one feeder link delay, wherein the at least one service link common delay or the at least one feeder link delay are associated with updating one or more timers other than at least one uplink timing.

3. The apparatus according to claim 2, wherein the at least one memory and the computer program code are configured to, with the at least one processor, further cause the apparatus at least to:
transmit the information that identifies the at least one service link common delay or the at least one feeder link delay to at least one other apparatus associated with at least one cell that is different than one or more cells associated with the apparatus.

4. The apparatus according to claim 2, wherein the at least one memory and the computer program code are configured to, with the at least one processor, further cause the apparatus at least to:
transmit at least one validity time or at least one starting point in time for the at least one service link common delay or the at least one feeder link delay.

5. The apparatus according to claim 2, wherein the at least one memory and the computer program code are configured to, with the at least one processor, further cause the apparatus at least to:
transmit information that identifies at least one delay difference associated with the at least one service link common delay or the at least one feeder link delay.

6. An apparatus, comprising:
at least one processor; and
at least one memory including computer program code,
wherein the at least one memory and the computer program code are configured to, with the at least one processor, cause the apparatus at least to:
receive information that identifies:
at least one service link common delay as a function of time based on at least one orbit of at least one satellite and at least one reference surface, or
at least one feeder link delay as a function of time based on the at least one orbit and at least one position of at least one network node; and
update one or more timers other than at least one uplink timing based on the at least one service link common delay or the at least one feeder link delay.

7. The apparatus according to claim 6, wherein the at least one reference surface is fixed to the at least one satellite or is fixed to earth.

8. The apparatus according to claim 6, wherein the at least one reference surface is unknown to the apparatus.

9. The apparatus according to claim 6, wherein at least one network node-user equipment physical layer delay is measured as at least one network node reference delay plus at least one residual delay between the at least one reference surface and the apparatus.

10. The apparatus according to claim 6, wherein the at least one reference surface comprises multiple reference surfaces when at least one cell associated with the at least one network node has a size that satisfies a threshold, wherein the apparatus is associated with a closest reference surface of the multiple reference surfaces.

11. The apparatus according to claim 6, wherein the at least one memory and the computer program code are configured to, with the at least one processor, further cause the apparatus, when receiving, at least to:
receive the information via broadcast of the information.

12. The apparatus according to claim 6, wherein the information is included in at least one of:
at least one parameter for at least one pre-specified parametrized function,
at least one index for at least one pre-specified function,
at least one combined function for both the at least one service link common delay or the at least one feeder link delay,
at least one system information block, or
radio resource control signaling.

13. The apparatus according to claim 6, wherein the at least one memory and the computer program code are configured to, with the at least one processor, further cause the apparatus at least to:
receive information that identifies input information associated with the at least one service link common delay or the at least one feeder link delay or information that identifies at least one refresh rate associated with the at least one service link common delay or the at least one feeder link delay.

14. The apparatus according to claim 6, wherein the at least one memory and the computer program code are configured to, with the at least one processor, further cause the apparatus at least to:
receive at least one validity time or at least one starting point in time for the at least one service link common delay or the at least one feeder link delay.

15. The apparatus according to claim 6, wherein the at least one memory and the computer program code are configured to, with the at least one processor, further cause the apparatus at least to:
receive information that identifies at least one delay difference associated with the at least one service link common delay or the at least one feeder link delay.

16. The apparatus according to claim 6, wherein the at least one memory and the computer program code are configured to, with the at least one processor, further cause the apparatus at least to:
receive at least one delay difference in a time domain associated with the apparatus.

17. The apparatus according to claim 6, wherein the at least one memory and the computer program code are configured to, with the at least one processor, further cause the apparatus at least to:
receive at least one network-controlled parameter, wherein the at least one network-controlled parameter is associated with causing at least one update of one or more timers at least one time determined by a function: at least one system frame number modulo the at least one network-controlled parameter.

18. The apparatus according to claim 6, wherein the at least one memory and the computer program code are configured to, with the at least one processor, further cause the apparatus, when updating, at least to:
update the one or more timers without resetting the one or more timers based on the one or more timers running at a time that the one or more timers are updated.

19. The apparatus according to claim 18, wherein the at least one memory and the computer program code are configured to, with the at least one processor, further cause the apparatus at least to:
determine to wait for expiration of the one or more running timers, before performing one or more actions, based on the updating prolonging running of the one or more timers.

20. The apparatus according to claim 18, wherein the at least one memory and the computer program code are configured to, with the at least one processor, further cause the apparatus at least to:
perform one or more actions based on the updating shortening the running of the one or more timers past an expiration time of the one or more timers.

* * * * *